Jan. 23, 1968  J. T. ELLIS, JR., ETAL  3,365,191
SHOCK ABSORBER
Filed June 29, 1965
2 Sheets-Sheet 2
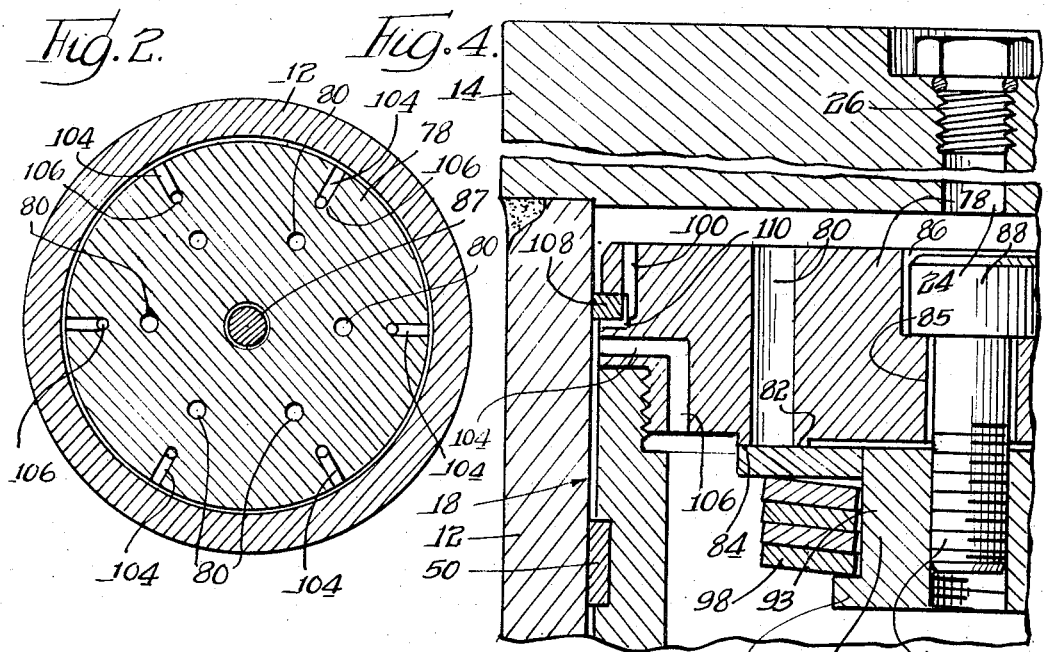
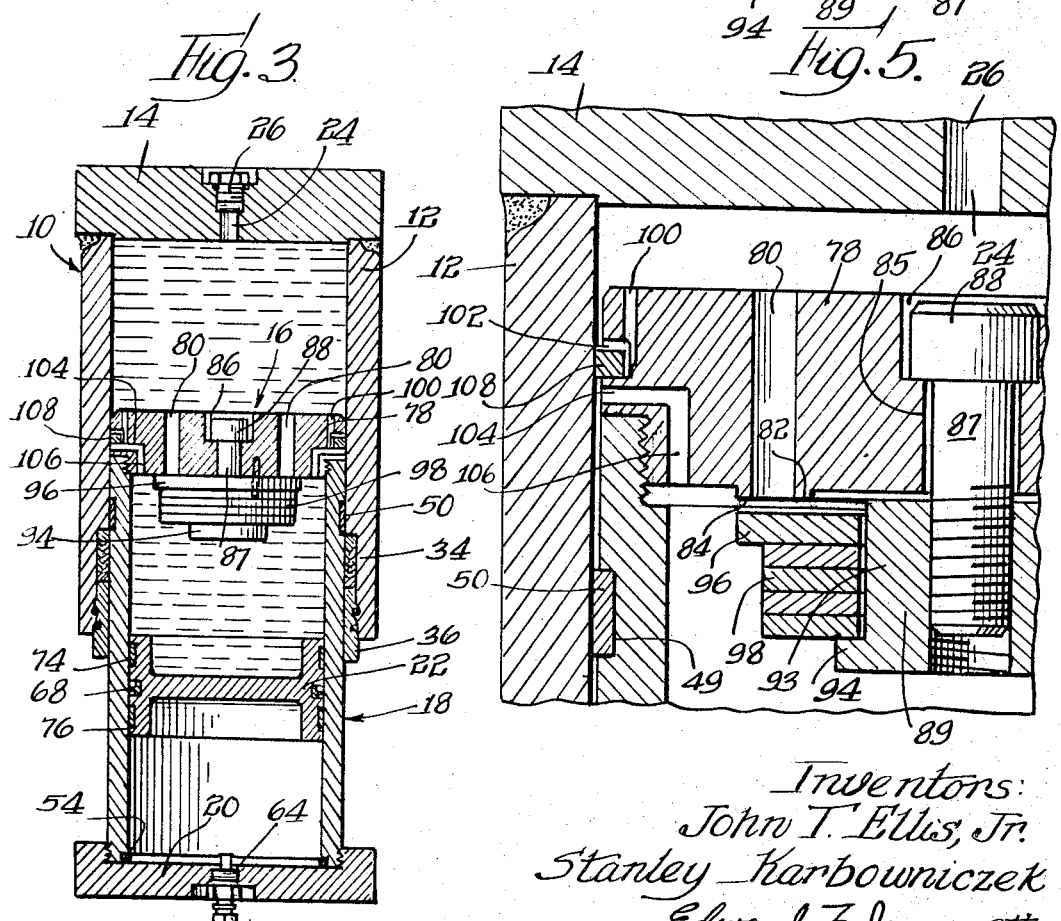
Inventors:
John T. Ellis, Jr.
Stanley Karbowniczek
Edward F. Jurow atty United States Patent Office 3,365,191
Patented Jan. 23, 1968

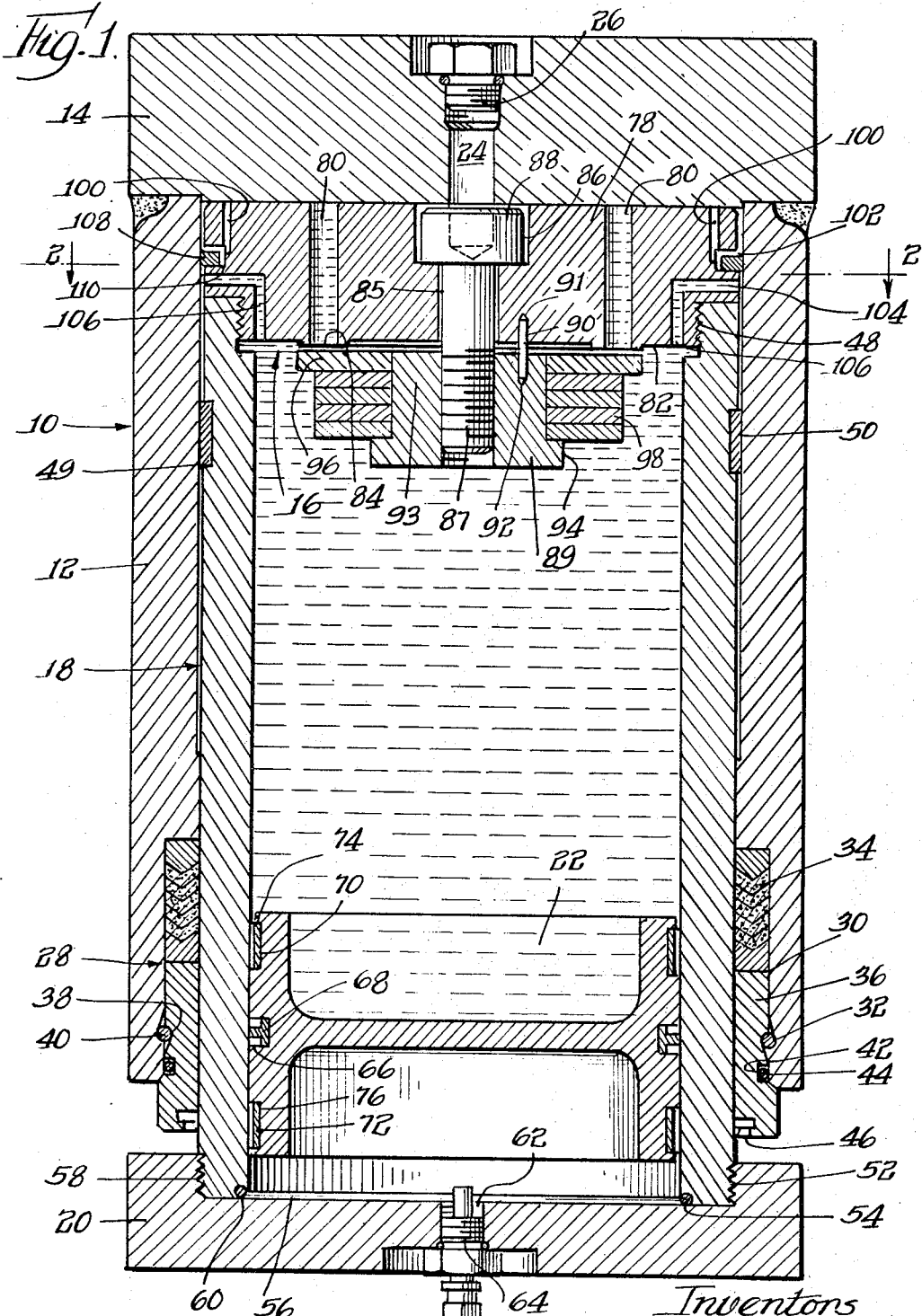

3,365,191
SHOCK ABSORBER
John T. Ellis, Jr., and Stanley Karbowniczek, Chicago, Ill., assignors to Ellis Fluid Dynamics Corporation, Chicago, Ill., a corporation of Illinois
Filed June 29, 1965, Ser. No. 467,990
5 Claims. (Cl. 267—64)

ABSTRACT OF THE DISCLOSURE

A shock absorber having a piston provided with a series of axially disposed control ports which are normally closed by a spring-biased valve plate until a predetermined pressure is developed during a working stroke of the piston with the effective force of the spring being readily adjustable to vary the predetermined pressure at which the control ports will be opened.

---

This invention relates to an improved construction for a shock absorber and more particularly for a shock absorber which is operable upon application of a predetermined amount of force and the invention also relates to an improved piston construction for use in the shock absorber.

In the application of shock absorbers, it is found that in certain instances, it is desirable for a shock absorber to remain substantially fixed unless a given load is applied to the shock absorber. There are many systems provided whereby a shock absorber is operable only after the application of a predetermined load. In all of the prior art systems, the mechanism for the operation of the shock absorber is complex, thereby making it expensive to manufacture and difficult to maintain the shock absorber. It is one of the primary objects of the herein-disclosed invention to provide a shock absorber and a piston construction wherein a predetermined force is utilized to operate a shock absorber at a selected rate, but in which the control mechanism is simple to manufacture and easy to maintain.

It is a further object of the instant invention to provide a shock absorber construction wherein an accumulator is built into the shock absorber and the accumulator also provides a means for returning the shock absorber to its initial position, thereby eliminating the necessity of springs or other mechanical devices to return the shock absorber to an initial position.

It is a still further object of the present invention to provide an improved piston construction, which piston construction has a return control means built therein for controlling the flow of a fluid through the piston.

It is another object of this invention to provide a shock absorber construction which is simple to manufacture and economical to maintain.

Other objects and uses of the present invention will become readily apparent to those skilled in the art upon a perusal of the following specification in light of the accompanying drawings in which:

FIGURE 1 is a cross-sectional view of a shock absorber embodying the herein-disclosed invention;

FIGURE 2 is a cross-sectional view of the shock absorber shown in FIGURE 1 taken on line 2—2 of FIGURE 1;

FIGURE 3 is a cross-sectional view of the shock absorber shown in FIGURE 1, but shown in an expanded or initial attitude;

FIGURE 4 is a fragmentary cross-sectional view of the shock absorber shown in FIGURE 1 showing a portion of the instant piston, but with a return control means in the piston in an open position to allow hydraulic fluid to return through the piston; and FIGURE 5 is similar to FIGURE 4, but shows the return control in the piston in a closed position and a valve ring plate in an open position to allow a fluid to flow through the piston at a metered rate.

Referring now to the drawings and especially to FIGURE 1, a shock absorber generally indicated by numeral 10 is shown therein. The shock absorber generally includes a cylindrical tube 12 having a tube head 14 sealingly fixed to one end thereof. A piston 16 is sealingly and slidably mounted in the tube. Tubular ram 18 has one end fixed to the piston and a ram head 20 is sealingly fixed to the other end of the ram. The ram has a free floating piston 22 sealingly and slidably mounted therein to provide an accumulator portion between the free floating piston and the ram head.

The construction of head 14 is conventional. The head has a port 24 in its central portion to provide a means for filling the tube with a conventional hydraulic fluid. A plug 26 is threadedly mounted in the head to seal closed port 24.

The tube 12 has one end welded to the head. Mounted in the other end of the tube is a gland 28. The tube has a gland recess 30 with a lock groove 32 formed in the tube. Conventional V-packing 34 is positioned in the recess to form a seal between the outside surface of ram 18 and tube 12. A gland ring 36 is mounted in the tube to retain the packing. The gland ring has a groove 38 in its outer periphery so that a plurality of balls 40 may be mounted in the groove formed by grooves 38 and 32 to hold the gland in position. The gland ring has a ring groove 42 formed therein with an O-ring 44 mounted in groove 42 to provide a seal between the tube and the gland ring. A wiper 46 is mounted in the gland ring and engageable with the ram to clean the ram in a conventional fashion as the ram slides into the tube.

The ram has internal threads 48 on the end opposite to the ram head, which threads threadedly connect the ram with the piston 16. Mounted on the outer periphery of the ram in a ring groove 49 is a wear ring 50 made of a nonmetallic material, which material has a low coefficient of friction to provide a suitable sliding support between the tube and the ram. Outside threads 52 are formed on the other end of the ram to provide a means for attachment of the ram head 20 to the ram. The ram contains a sealing groove 54 on the end adjacent to the ram head.

The ram head includes a recess 56 with internal threads 58 formed therein for mating engagement with threads 52 on the ram. A seal 60 is mounted in groove 54 to provide a seal between the ram and the ram head. The ram head includes a port 62 with a conventional valve 64 mounted therein to provide a means for charging air into the space between the ram head and the free floating piston 22.

The free floating piston contains a ring groove 66 at its central portion with a T-ring 68 positioned in the groove and in sealing engagement with the interior surface of the ram. The piston has a pair of broad grooves 70 and 72 adjacent to its opposite edges and wear rings 74 and 76 positioned in the grooves 70 and 72, respectively. The wear rings 74 and 76 are made of a material identical to that of wear ring 50.

The piston 16 includes a head 78 with six axial control ports 80 formed therein and being equally radially spaced adjacent to the outer periphery of the head. The head includes an annular boss 82 on one of its faces through which the control ports pass. The boss has a finished valve surface 84 thereon for reasons which will become apparent hereinafter. An axial screw aperture 85 is positioned in the center of the piston head with a head recess 86 formed integral therewith. A conventional Allen head screw 87 is positioned in the screw aperture with a head 88 of the screw positioned in the head recess. Threadedly mounted on the screw 87 is a control plug 89 for retaining and supporting valve means for the central parts. A pin 90 is press fitted into an aperture 91 in the piston head, and the pin is slideably received in a pin aperture 92 in the control plug to prevent relative rotation between the control plug and the piston head to allow the screw to be adjusted for determining the proper resilience of the valve means as will be hereinafter described in detail. The control plug includes a shank 93 and an annular shoulder 94. Slideably mounted on the control plug shank is a valve ring plate 96 which is sealingly engageable with the valve surface 84 of the annular boss to seal closed selectively the control ports 80. Four resilient ring washers 98 are mounted on the control plug between the shoulder 94 and the valve ring plate 96 to urge constantly the valve ring plate into sealing engagement with the annular boss.

It may be appreciated that the operative pressure of the instant shock absorber may be easily and readily adjusted. In order to adjust the operative pressure, plug 26 is first removed to provide access to screw 87. A conventional Allen head wrench is then inserted through port 24 into engagement with head 88. By appropriate turning of screw 87, the washers 98 are adjusted to apply a proper force to valve ring plate 96 thereby determining the pressure which will displace the valve ring plate from finished surface 84. It is obvious that as the screw is tightened and the washers are compressed, a greater force is required to displace the valve ring plate and the converse is also true.

The piston includes a return control means in its outer periphery. The piston head has six radially equally spaced return ports 100 adjacent to its outer periphery. A return groove 102 is formed in the outer periphery of the piston head and the return groove communicates with each of the return ports. Six radial ports 104 are formed in the outer periphery of the piston head. Communicating with each of the radial ports is an axial port 106. Each of the axial ports opens into the space between the piston 16 and the free floating piston 22. A return ring 108 is mounted in return groove 102 and the ring is in sliding and sealing engagement with the interior surface of the tube 12. The return ring is also sealingly engageable with a wall 110 of the piston head defining a portion of groove 102 to control the flow of fluid through the groove. It may be seen that the return ring 108 has a width substantially less than the width of groove 102 for reasons which will become apparent hereinafter.

Referring now to FIGURE 3 which shows the shock absorber 10 in its initial or expanded position, the space between the piston 16 and head is filled with a hydraulic fluid as well as the space between free floating piston 22 and piston 16. The space between the ram head 20 and the free floating piston 22 is filled with air or another suitable compressible fluid. Upon the application of a compressive force to heads 14 and 20, the pressure of the hydraulic fluid between the piston 16 and head 14 is increased until the pressure is sufficiently great to unseat the valve ring plate 96 from valve surface 84 of the annular boss which valve ring plate cooperating with the spring washers acts as a pressure relief valve. At this point, the piston 16 assumes the attitude shown in FIGURE 5. It should be noted that the return ring 108 is in sealing engagement with the interior surface of the tube and also in sealing engagement with the wall 110 of groove 102 to act as a return valve in one direction only. Thus, there is no opportunity for fluid to flow around the outer periphery of the piston 16. It is also readily apparent that the flow of hydraulic fluid passes entirely through control ports 80 so that there is a controlled or metered rate of flow through the piston. As piston 16 moves toward head 14, the volume of the ram displaces a given amount of hydraulic fluid. This volume is taken up by the free floating piston 22 which is forced toward the ram head to compress the air between the ram head and the free floating piston. It should be noted that this compression of the compressible fluid between the ram head and the free floating piston serves to build up a back pressure in the space between the free floating piston and piston 16. Thus, the greater the displacement of the piston, the greater the back pressure to increase the absorbent force of the instant shock absorber.

Once the compressive force is released from the shock absorber, the compressed air between the ram head and the free floating piston serves to provide the necessary energy to return the shock absorber from an attitude such as that shown in FIGURE 1 to its initial attitude such as that shown in FIGURE 3. The free floating piston being under pressure from the compressive fluid applies a pressure to the fluid between the free floating piston and piston 16. The pressure of the fluid forces the return ring 108 to shift relative to the piston head in a direction toward head 14. Thus, fluid may flow through the axial ports 106 into the radial ports 104 and pass the space between the piston and the interior surface of the tube. The fluid then flows into the return groove 102 and through the return ports 100 to the space between the head 14 and piston 16. It should be noted that the free floating piston within the ram provides a dual function of providing an accumulator and a return means for the subject shock absorber.

From the foregoing, it is apparent that the construction of the instant shock absorber is such that the shock absorber may be designed to hold a given predetermined load before there is any substantial movement of the shock absorber. This means that in certain instances when the instant shock absorber is used only in emergency conditions, it may provide a firm or solid base, but upon the occurrence of an emergency when severe loads are applied, it will operate to provide a cushioning effect. The instant shock absorber provides the cushioning effect only upon the application of a severe load by requiring the pressure in the space between the piston 16 and head 14 to build up to a predetermined value before there is any cushioning. Once the predetermined value is achieved, the valve ring plate is displaced from the annular boss to open the control ports 80 thereby providing the necessary cushioning when needed.

Although a specific embodiment of the hereindisclosed invention has been shown and described in detail above, it is readily apparent that those skilled in the art may make various modifications and changes without departing from the spirit and scope of the instant invention. It is to be expressly understood that the subject invention is limited only by the appended claims.

What is claimed is:

1. A shock absorber comprising, in combination, an elongated cylindrical tube, a tube head sealingly mounted on one end of said tube to close said end, a tube head valve mounted in said tube head, a piston sealingly and slidably mounted in the tube, an adjustable relief valve mounted in said piston to allow a fluid to flow through the piston in one direction when said fluid attains a predetermined pressure, a return valve connected to said piston to allow fluid to flow in the opposite direction, an elongated cylindrical ram having one end sealingly connected to the piston, a ram head sealingly mounted on the other end of said ram, a ram head valve mounted in the ram head to provide a means for introducing a compressible fluid, and a free floating piston sealingly and slidably mounted within the ram, whereby movement of the first mentioned piston toward the cylinder head causes fluid to flow from the one side of the piston to the other and to displace the free floating piston thereby compressing the compressible fluid between the ram head and the free floating piston.

2. A piston construction comprising, in combination, a piston head, said piston head having a plurality of axial control ports, a valve plate sealingly engageable with said piston head for controlling the flow of a fluid through the control ports, a spring washer connected to the valve plate for holding the valve plate in sealing engagement with the piston head, and a valve plug threadedly connected to the piston head supporting the spring washer and holding the spring washer in resilient engagement with the valve plate, whereby the force required to displace the valve plate from the piston head against the spring washer may be adjusted by positioning the valve plug relative to the piston head.

3. A piston construction comprising, in combination, a piston head, said piston having a plurality of axial control ports, a ring valve plate sealingly engageable with said piston head for controlling the flow of a fluid through the control ports, a spring washer connected to the valve plate for holding resiliently the valve plate in sealing engagement with the piston head and to be displaced by a predetermined force, a valve plug supporting the spring washer and being connected to the spring washer to determine the force applied by the spring washer to the valve plate, a screw mounted in the piston head and threadedly connected to the valve plug for positioning the valve plug relative to the piston head for determining the force applied to the valve plate by the spring washer, and a pin connecting the valve plug and the piston head to prevent rotation of the valve plug relative to the piston head to allow the screw to be rotated without rotating the valve plug for adjusting the force required to displace the valve plate.

4. A shock absorber comprising, in combination, an elongated cylindrical tube, a tube head sealingly mounted on one end of said tube to close that end of said tube, a piston slideably mounted in said tube, said piston having a piston head having a plurality of axial control ports, a valve plate sealingly engageable with said piston head on the side of the piston head spaced from said head for controlling the flow of a fluid through the control ports, a spring washer connected to the valve plate for holding resiliently the valve plate in sealing engagement with the piston head, a valve plug supporting said spring washer and connected to the spring washer to urge the spring washer toward the valve plate, a screw having a screw head positioned adjacent to the tube head and said screw extending through the piston head for threaded connection with the valve plug to support the valve plug, said tube head having an opening axially registerable with the screw head, and a plug sealingly mounted in the opening of the head, whereby the force applied to the valve plate by the spring washer is adjustable by removing the plug and inserting a tool through the opening in the tube head to rotate the screw relative to the valve plug.

5. A shock absorber comprising, in combination, an elongated cylindrical tube, a head sealingly mounted on one end of said tube, a piston head sealingly and slideably mounted in said tube, said piston head having a ring groove in its outer periphery, a plurality of return ports extending axially in said piston head and communicating with the ring groove, a control ring slideably and sealingly mounted in the tube and being movably mounted in said ring groove for sealing engagement with the piston head, a plurality of radial ports communicating with the return groove, an axial port communicating with each of the radial ports and the side of the piston head spaced from the head, said piston head having a plurality of axial control ports for controlling a metered flow of a hydraulic fluid through the piston head, a screw extending through the piston head, a control plug threadedly mounted on said screw, means preventing relative rotation between the control plug and the piston head, a valve ring plate slideably mounted on the control plug and sealingly engageable with the piston head to control the flow of a hydraulic fluid through the control ports, a spring washer mounted on the control plug and connected to the valve ring plate to urge constantly the valve ring plate into sealing engagement with the piston head, a cylindrical ram connected to the piston for movement therewith and being sealingly engageable with the cylindrical tube, and a free floating piston sealingly mounted in the ram, whereby movement of the piston head toward the head increases the pressure of a hydraulic fluid between the head and the piston head to displace the valve ring plate to allow hydraulic fluid to flow through the control ports at a metered rate and thereby displace the free floating piston.

References Cited

UNITED STATES PATENTS

| | | | |
|---|---|---|---|
| 2,982,538 | 5/1961 | Bourcier de Carbon | 267—64 |
| 3,145,985 | 8/1964 | Bourcier de Carbon | 267—64 |
| 3,077,345 | 2/1963 | Andersson et al. | 267—64 |
| 3,250,525 | 5/1966 | Peterson | 267—1 |

ARTHUR L. LA POINT, *Primary Examiner.*

R. M. WOHLFARTH, *Assistant Examiner.*